(12) United States Patent
Lee

(10) Patent No.: US 11,425,074 B1
(45) Date of Patent: Aug. 23, 2022

(54) METHODS, APPARATUSES, AND SYSTEMS FOR PROVIDING AN EVENT EVALUATION FRAMEWORK

(71) Applicant: Groupon, Inc., Chicago, IL (US)

(72) Inventor: In Jae Lee, Shoreline, WA (US)

(73) Assignee: Groupon, Inc., Chicago, IL (US)

( * ) Notice: Subject to any disclaimer, the term of this patent is extended or adjusted under 35 U.S.C. 154(b) by 259 days.

(21) Appl. No.: 15/395,303

(22) Filed: Dec. 30, 2016

Related U.S. Application Data

(60) Provisional application No. 62/273,569, filed on Dec. 31, 2015.

(51) Int. Cl.
| | |
|---|---|
| *H04L 51/18* | (2022.01) |
| *H04L 51/58* | (2022.01) |
| *H04L 67/00* | (2022.01) |
| *G06F 9/54* | (2006.01) |
| *G06Q 30/02* | (2012.01) |
| *G06Q 20/38* | (2012.01) |
| *G06Q 10/10* | (2012.01) |

(52) U.S. Cl.
CPC .............. *H04L 51/18* (2013.01); *G06F 9/542* (2013.01); *G06F 9/546* (2013.01); *H04L 51/38* (2013.01); *H04L 67/34* (2013.01); *G06Q 10/107* (2013.01); *G06Q 20/387* (2013.01); *G06Q 30/0225* (2013.01); *G06Q 30/0235* (2013.01); *G06Q 30/0255* (2013.01)

(58) Field of Classification Search
CPC ......... H04L 51/18; H04L 51/38; H04L 67/34; G06F 9/542; G06F 9/546
USPC ....................................................... 709/206
See application file for complete search history.

(56) References Cited

U.S. PATENT DOCUMENTS

| | | | |
|---|---|---|---|
| 5,504,896 A * | 4/1996 | Schell ................ | H04N 7/17336 348/E7.073 |
| 7,197,561 B1 * | 3/2007 | Lovy .................. | H04L 41/0233 709/217 |
| 2006/0085681 A1 * | 4/2006 | Feldstein ............ | G06F 11/3692 714/25 |
| 2016/0284010 A1 * | 9/2016 | Zimmerman ...... | G06Q 30/0633 |
| 2017/0085512 A1 * | 3/2017 | Bray ....................... | H04L 51/22 |
| 2017/0195438 A1 * | 7/2017 | Schneider ............. | H04L 67/325 |

\* cited by examiner

*Primary Examiner* — Kevin S Mai
(74) *Attorney, Agent, or Firm* — Alston & Bird LLP

(57) ABSTRACT

In general, embodiments of the present invention provide systems, methods and computer readable media for a defining and executing state machines that act based on messages received on a message queue.

18 Claims, 8 Drawing Sheets

FIG. 6

METHODS, APPARATUSES, AND SYSTEMS FOR PROVIDING AN EVENT EVALUATION FRAMEWORK

CROSS-REFERENCE TO RELATED APPLICATIONS

The present application claims the benefit of priority to U.S. Provisional Application Ser. No. 62/273,569 titled "METHODS, APPARATUSES, AND SYSTEMS FOR PROVIDING AN EVENT EVALUATION FRAMEWORK," filed on Dec. 31, 2015, the contents of which are incorporated herein by reference in their entirety.

TECHNOLOGICAL FIELD

Example embodiments of the present invention relate generally to event-driven management of state machines and, more particularly, to a methods, apparatuses, and systems for initializing, managing, defining, implementing, and testing state machines for use with a message queue in a multi-tenant integrated system.

BACKGROUND

The applicant has discovered problems with current methods, systems, and apparatuses for managing event-driven state machines in a multi-tenant architecture. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product provide a system for defining and executing state machines that act based on messages received on a message queue. Implementations also include interfaces and applications for authoring, testing, and initializing state machines and workflow processes for use in a multi-tenant system architecture. Embodiments further provide standardized application programming interfaces (APIs) to provide controlled access to various system functionalities without requiring state machine authors to have an in-depth understanding of underlying system code. Some example embodiments may also expose certain functionalities to external tenants (e.g., customers or merchant-users of a system) that provide controlled access to certain system resources while also isolating other functionality. Example embodiments also include tools and systems for monitoring state machine performance, tracking state machine metrics, and associating state machines to particular users or application instances (e.g., state machines defined for individual consumers).

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
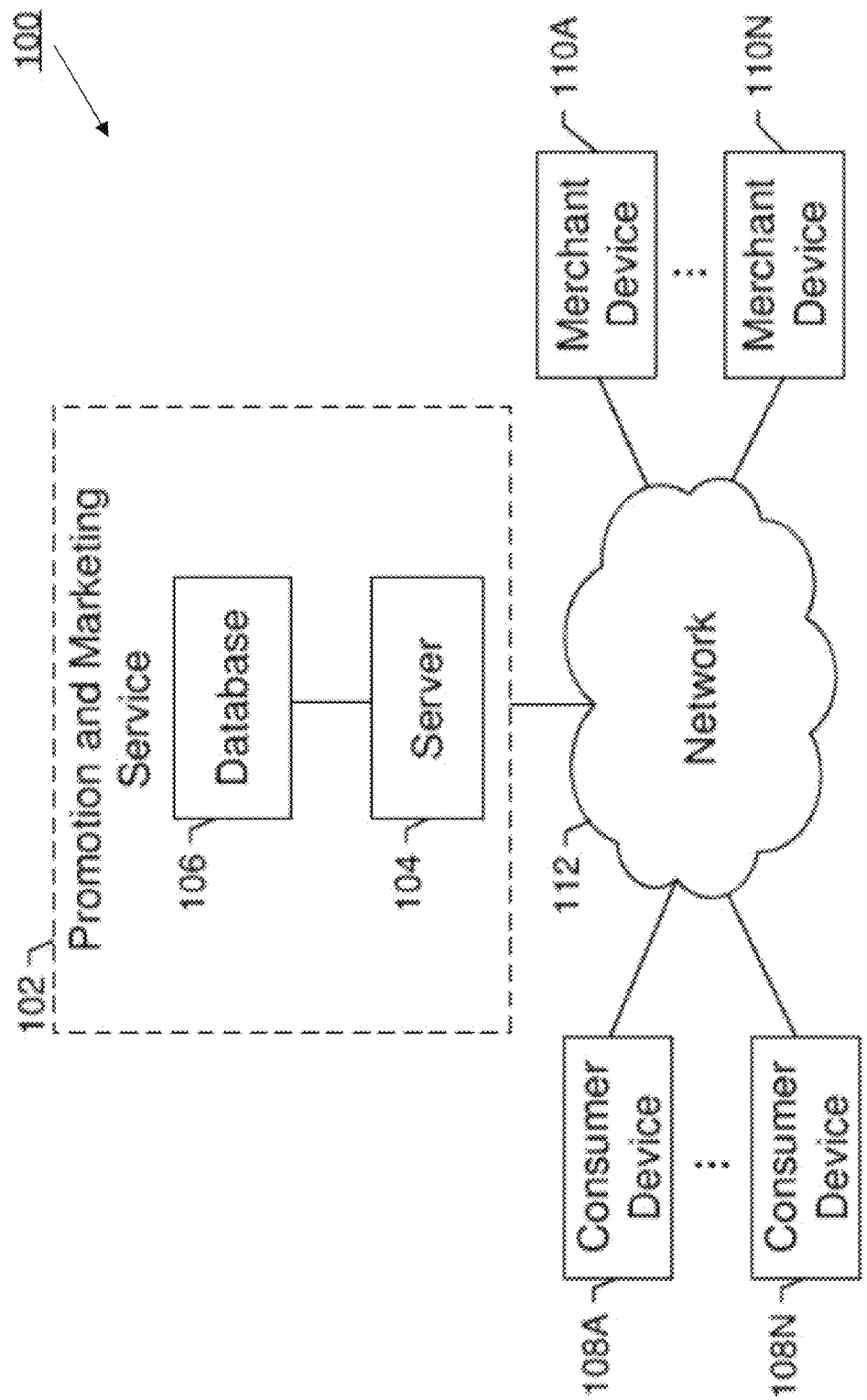
Figure 2:
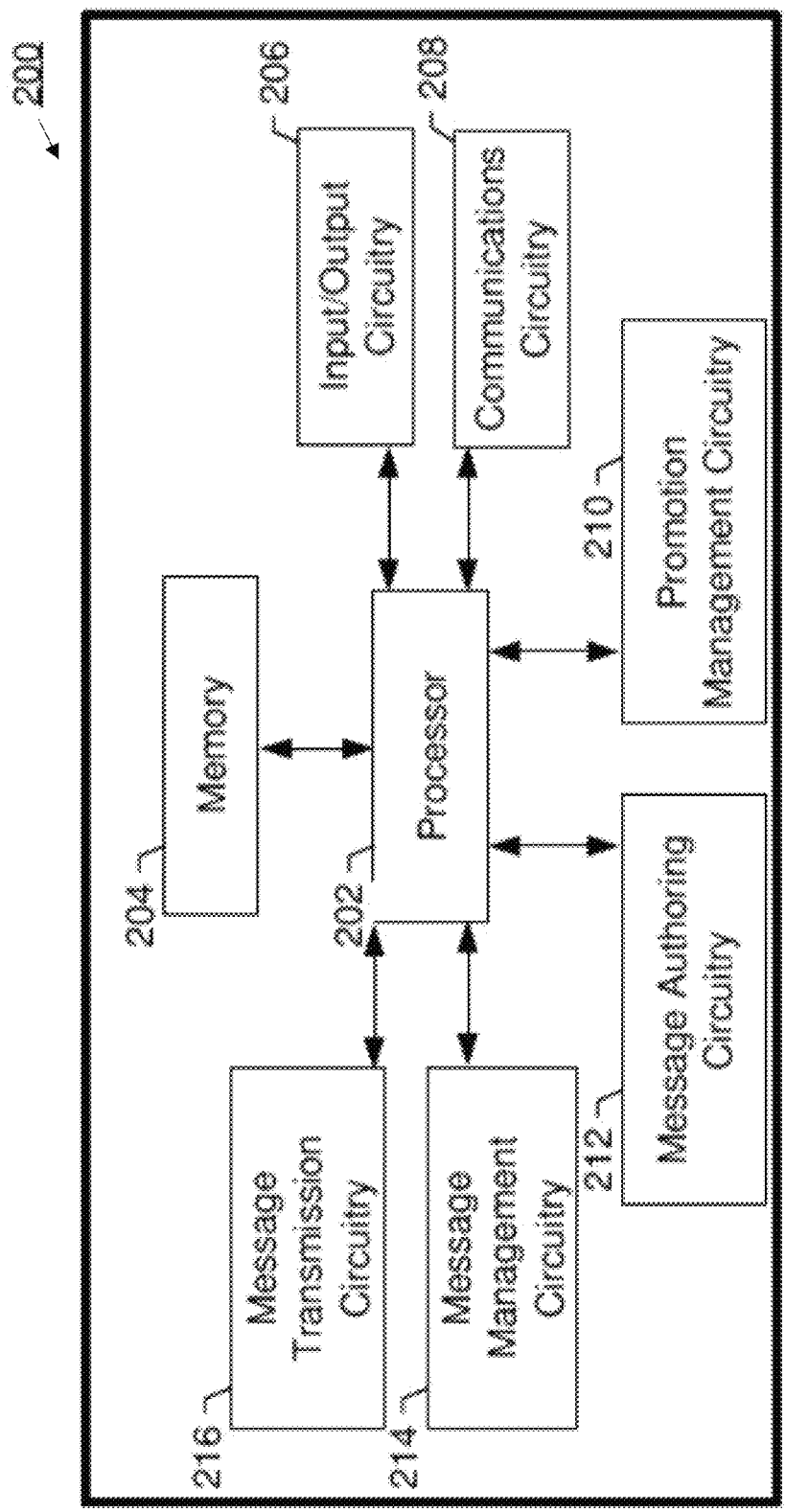
Figure 3:
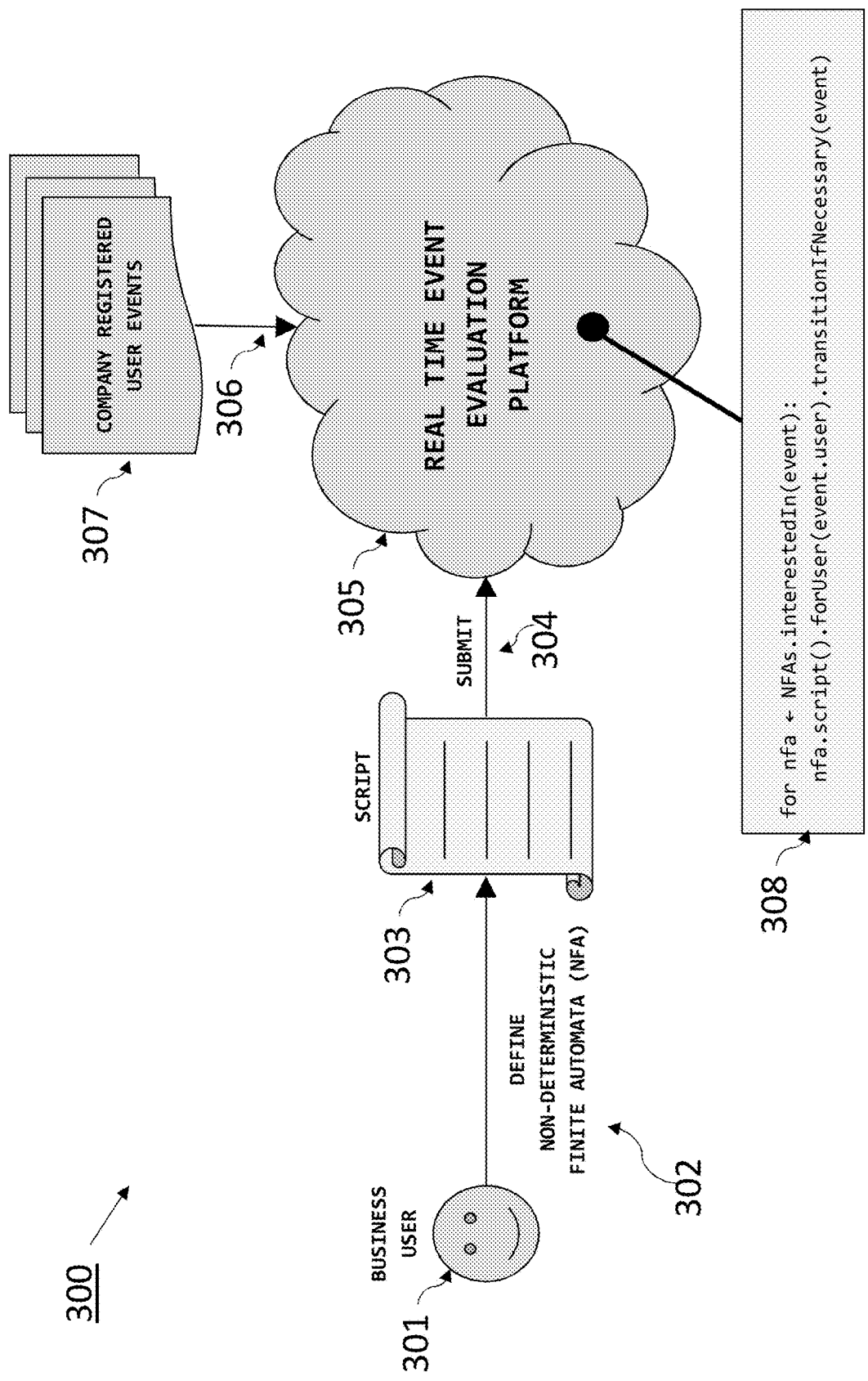
Figure 4:
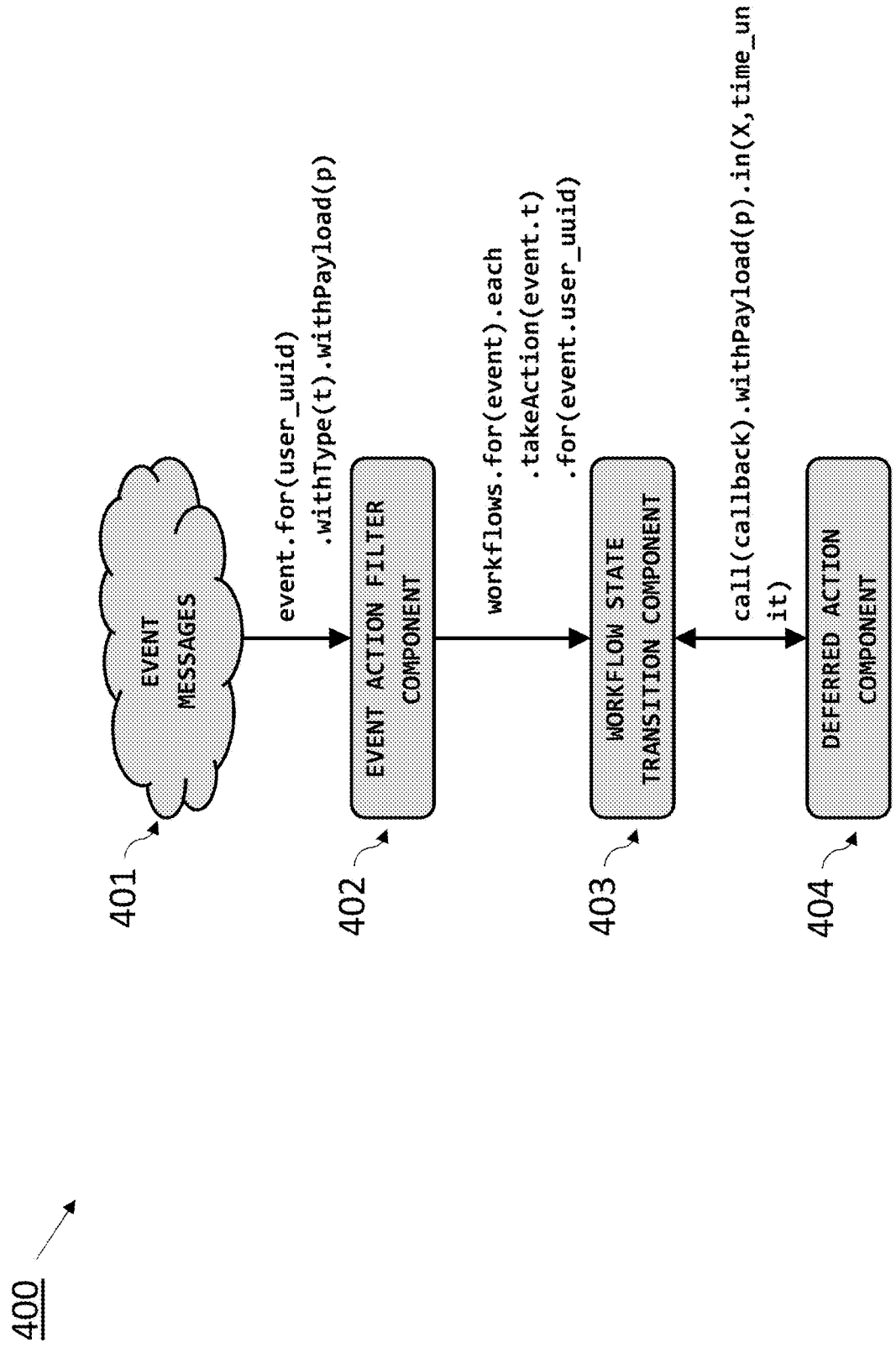
Figure 5:
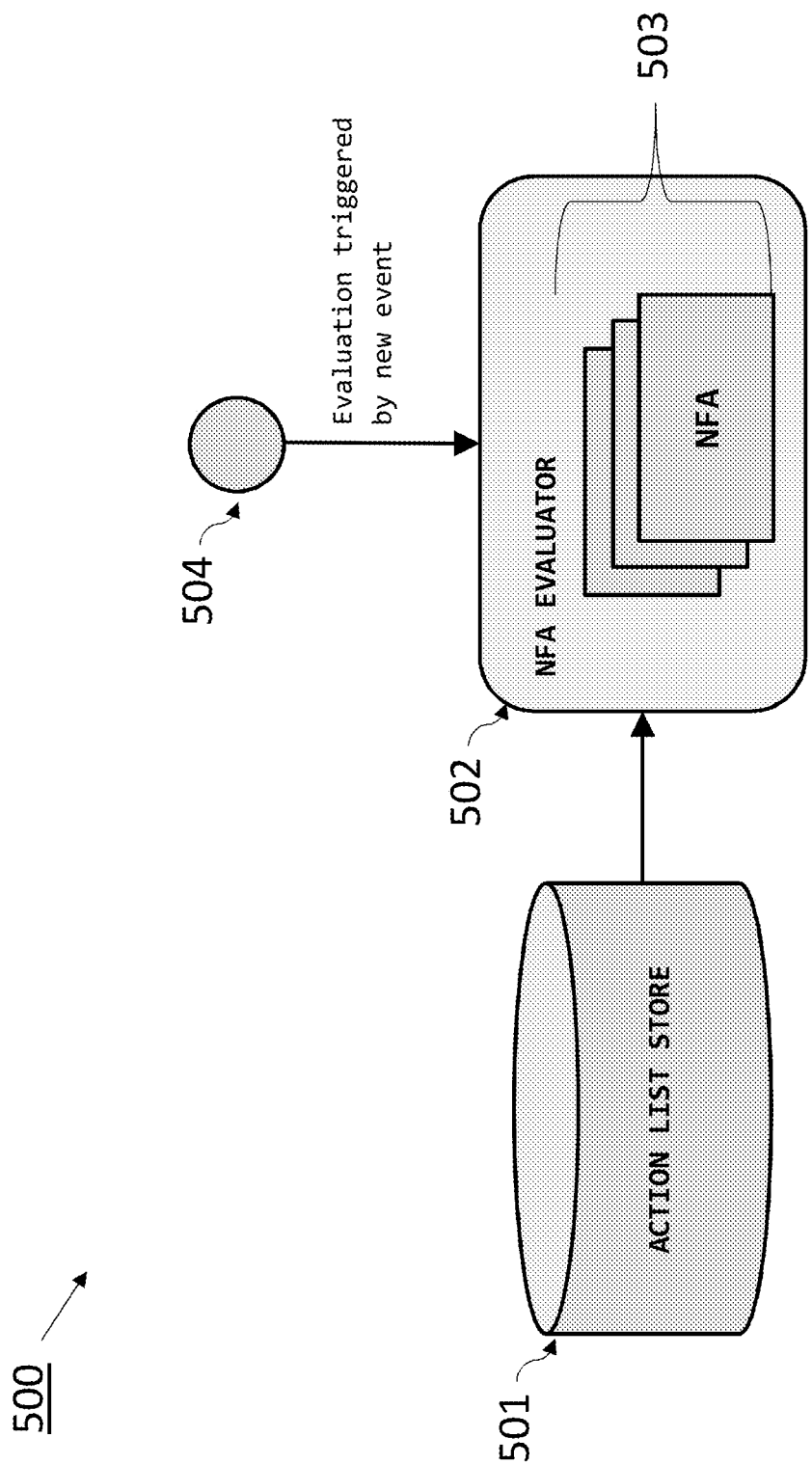
Figure 7:
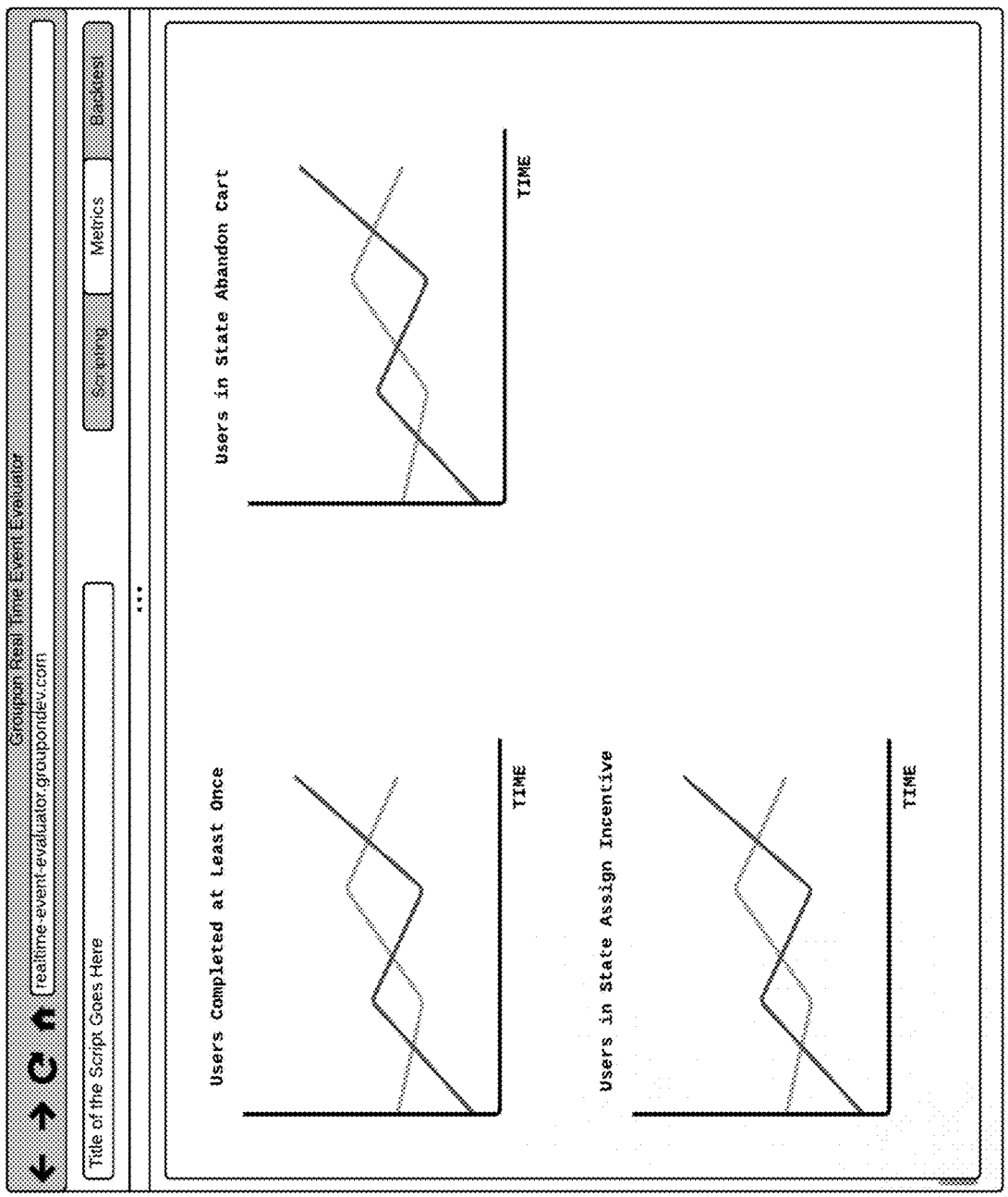
Figure 8:
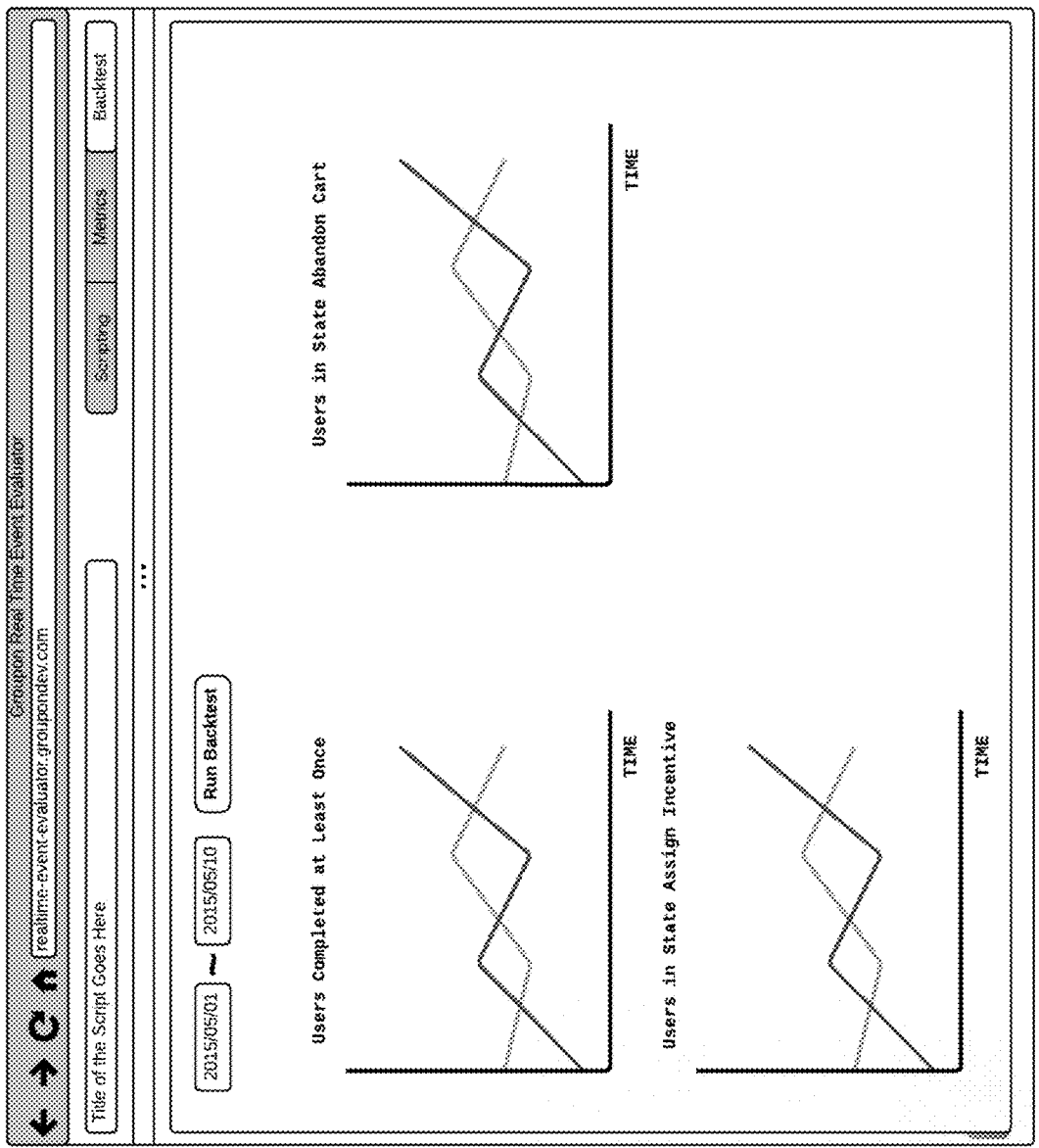

Having thus described certain example embodiments of the present disclosure in general terms, reference will now be made to the accompanying drawings, which are not necessarily drawn to scale, and wherein:

FIG. 1 illustrates an example network within which embodiments of the present invention may operate; and FIG. 2 illustrates a block diagram showing an example device for implementing a real-time event evaluation framework using special-purpose circuitry in accordance with some example embodiments of the present invention;

FIG. 3 illustrates an example real time event evaluation platform topology in accordance with some example embodiments of the present invention;

FIG. 4 illustrates an example data flow within a real time event evaluation platform in accordance with some embodiments of the present invention;

FIG. 5 illustrates an example data flow within a real time event evaluation platform in accordance with some embodiments of the present invention;

Figure 6:
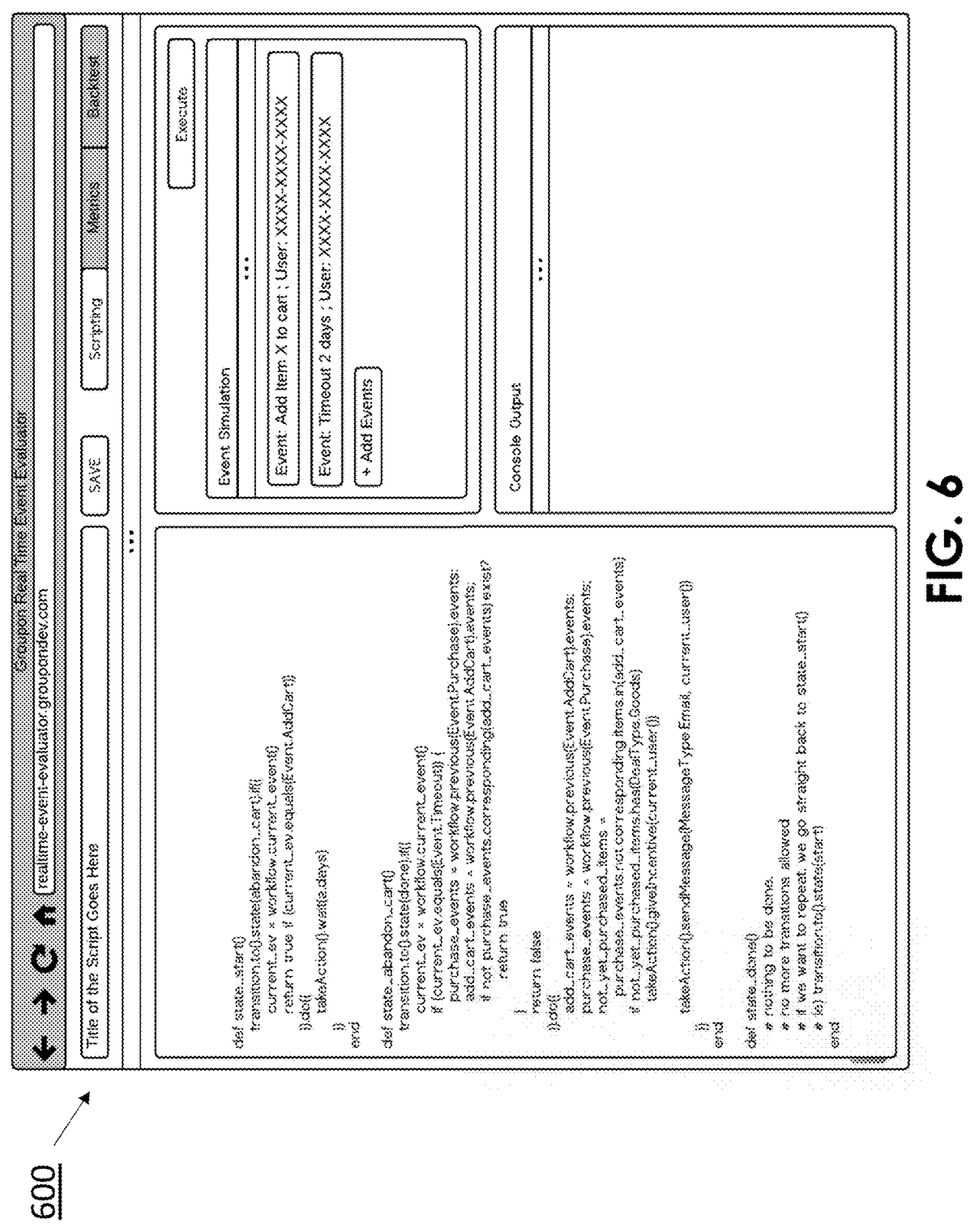

FIG. 6 illustrates an exemplary script generation interface for use with embodiments of the present invention;

FIG. 7 illustrates a status tracking interface for use with embodiments of the present invention; and FIG. 8 illustrates a backtest interface for use with embodiments of the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

Various embodiments of the present invention are directed to improved apparatuses, methods, and computer readable media for providing real-time management of events in a multi-tenant system. In this regard, embodiments may provide an interface and framework for authoring, initializing, testing, executing, and monitoring a series of state machines. The state machines may read messages from a message queue that relate to events occurring in a multi-tenant system. The state machines may register for particular message types and take certain actions based on receiving those message types. Embodiments may provide a framework for the state machines to execute and determine whether and when particular events have occurred, based on received messages. State machines may execute in parallel and asynchronously, and the framework may provide for the ability to execute arbitrary functions in response to the occurrence of certain events. For example, a state machine may be configured to execute certain API calls or other executable code in response to the occurrence of certain events as determined based on received messages.

Embodiments may also provide dashboard interfaces and authoring interfaces for defining state machines, viewing the status of state machines, and determining metrics for the state machines. For example, embodiments may include an Integrated Development Environment (IDE) that allows an author to write script to define a state machine. The IDE may allow for definition of particular messages that the defined state machine will listen for, and scripted code may define the actions taken by the state machine in response to certain events. The IDE may further include the capability to simulate events, manually add messages to the message queue, and the like. The IDE may include the capability to monitor the status of a state machine as execution is simulated and events occur.

Embodiments may also include systems and algorithms for monitoring of state machines and providing metrics and analytics. For example, embodiments may track the number of times a particular state machine is executed, the number of times a state machine transitions to a particular state or status, the number of state machines defined for particular users, or the like.

As used herein, the term "state machine" refers to a model of computation used to design both computer programs and sequential logic circuits. It is a machine that can be in one of a finite number of states. The machine is in only one state at a time; the state it is in at any given time is called the current state. It can change from one state to another when initiated by a triggering event or condition; this is called a transition. A particular finite state machine (FSM) is defined by a list of its states, its initial state, and the triggering condition for each transition.

In automata theory, a finite state machine is called a deterministic finite automaton (DFA) if each of its transitions is uniquely determined by its source state and input symbol, and reading an input symbol is required for each state transition. A nondeterministic finite automaton (NFA), or nondeterministic finite state machine, does not need to obey these restrictions.

As used herein, the term "state transition" refers to a transition from a current state to a next state of a state machine.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "device rendered object" refers to a set of machine executable commands that instruct a processor to render for display on a computing device display an object comprising text data and/or image data. The machine executable commands and/or the device rendered object can be stored in a machine readable storage device. The device rendered object comprising text and/or images may represent a "deal" or "promotion" with which a user using the computing device may interact and transact.

As used herein, the terms "promotion" and "deal" may be used interchangeably to refer to a data instance or entity representing an agreement by a provider to provide particular goods, services and/or experiences to a user in response to receiving a user acceptance indication from an offering service. A trilateral inventory object is described by a set of transaction attributes, including data describing the provider, offering service to user transaction terms, and provider to offering service transaction terms, and a time period during which the trilateral inventory object is valid.

As used herein, the terms "offering service," "promotion offering service," "deal offering service," and "device rendered object offering service" may be used interchangeably to refer, without limitation, to a service that is accessible via one or more computing devices and is operable to offer deals for purchase to consumers. A deal offering service maintains an inventory of deals, from which it generates deal offering programs. A deal offering program includes a set of deals, most typically deals that are instances of the same deal entity. A deal offering program is described by a set of deal program attributes including the quantity of deals in the program, the time period during which the program is active, and, optionally, a rate of deal offering during the program.

A deal offering service, or device rendered object offering service, is configured to offer a deal as an instrument that is redeemable by a consumer who purchases the deal for the goods, services, and/or experiences specified in the agreement. The deal offering service is further configured to illustrate or otherwise inform one or more consumers of the availability of one or more instruments in the form of one or more impressions. In some examples, the deal offering service may also take the form of a redemption authority, a payment processor, a rewards provider, an entity in a financial network, a promoter, an agent and/or the like. As such, the service is, in some example embodiments, configured to present one or more deals via one or more impressions, accept payments for deals from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more deals or device rendered objects. For example, and using the aforementioned running company as the example provider, an e-mail communication sent to consumers that indicates the availability of a $25 for $50 toward running shoes promotion.

As used herein, the terms "consumer," "user," and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

It is appreciated while various embodiments discussed herein refer to data describing promotions, promotion offers, consumers, and their respective attributes, the techniques discussed herein may also be applicable to other types of data or other objects or entities.

It should be readily appreciated that the embodiments of the methods, systems, devices, and apparatuses for providing a real-time event management framework may be configured in various additional and alternative manners to provide for monitoring and management of a home network based as described herein.

Technical Underpinnings and Implementation of Exemplary Embodiments in an Example System As supply chain management, customer relationship management, and other key information technology systems have become more and more important and powerful, these systems have also increased in complexity. A given architecture may include disparate systems for managing users, customers, and/or clients, systems for managing product inventories and supply chains, systems for managing outgoing communications (e.g., mail servers, web servers), systems for measuring analytics and performance metrics (e.g., web analytics, impression tracking), and the like. These systems may be the subject of complex interactions with one another, and existing frameworks may require tight coupling of disparate systems and exposure of secure functionality to external systems. These complex interconnections may make such systems inflexible, create security holes, and present other problems that are addressed by embodiments of the present invention.

In particular, embodiments provide a framework for defining a series of state machines. These state machines operate as independently executing objects that monitor a message queue for particular messages for which the state machine is registered. As the state machine monitors these messages, events are tracked and the status of the state machine is updated. Updated statuses of the state machines may be associated with particular processing tasks that cause the state machine to take certain actions. Embodiments also include tools for authoring, testing, and debugging state machines as described herein.

To more clearly illustrate the functioning of embodiments of the present invention, the instant disclosure may describe exemplary embodiments in the context of an e-commerce system. However, it should be readily apparent that embodiments may also relate to any other system where complex interactions occur between disparate information technology systems, such as medical information systems, supply chain management systems, customer relationship management systems, project management systems, manufacturing systems, or the like.

For example, consider an electronic commerce system that includes an email marketing server, a web server, a consumer database, a customer relationship management system, a sales transaction system, a merchant interface, and one or more promotion systems. Such a system may be configured to send messages to consumers advertising promotions or goods, process e-commerce transactions, receive newly defined promotions from merchants, track promotion performance through the use of analytics, and various other tasks. Such a system would benefit from the ability to dynamically choose whether and when to send marketing communications, generate new promotions for sale, and other tasks. For example, when a merchant defines a new promotion, it may be desirable to automatically send a notification to consumers that have previously expressed an interest in a promotion of that type. However, the more complex the system, the more difficult it is to ensure that when an event occurs (e.g., a new promotion is published, an item is added to a cart, or a sales transaction occurs), other elements of the system are updated accordingly to trigger other processes.

Embodiments of the present invention allow for system stakeholders to define particular state machines that monitor a unified message queue for particular messages. The particular messages associated with each state machine may be defined at the time the state machine is authored. Each state machine may undertake certain processing tasks when appropriate events have occurred to enter a particular status for the state machine. For example, in an electronic commerce system, a set of state machines may be assigned to each consumer, such that processing associated with that consumer occurs when certain events associated with that state machine occur. State machines may perform tasks such as sending communications (e.g., generating and transmitting an email), updating consumer records (e.g., adding demographic information, impression information, or the like), tracking analytics (e.g., performing tasks based on a consumer viewing a promotion), or the like. These tasks may be defined within a set of APIs made accessible to the state machine.

Embodiments may include a unified message queue that each state machine and each disparate component of the system may access. For example, each of the email server, web server, and other system components enumerated above may be configured to pass certain events on to the message queue for consumption by the state machine. Events that are published to the message queue may be any occurrence by a component of the system. For example, in the e-commerce context, events may include, without limitation, items being added to a cart, removed from a cart, purchased, orders cancelled, items viewed, marketing communications being sent to the consumer, new consumers registering with the system, customers indicating particular preferences, or the like.

Embodiments may also include tools and interfaces for defining and testing state machines. As noted above, embodiments include an integrated development environment (IDE). The IDE provides an interface for defining scripted code for the state machine, an interface for registering the state machine with particular messages, and interfaces for monitoring and testing state machines. For example, embodiments include an IDE that allows for simulating messages on the message queue to monitor the impact of those simulated messages on the state machine for testing and debugging purposes. The IDE may also provide an interface displaying the state of the state machine at any given time based on real and/or simulated events.

Embodiments also include a dashboard interface for monitoring an executing state machine or machines. This interface may provide statistics such as the number of times the state machine has executed, the number of times the state machine transitions into a particular state, the number of each state machine that is executing, and the like.

Embodiments may also provide an external interface for allowing external users to author and/or monitor state machines. For example, in the context of an e-commerce system, embodiments may allow merchants to define their own state machines for execution within the framework. In such embodiments, the functionality exposed to externally-authored state machines may be carefully monitored, tracked, and/or limited to avoid exposure of sensitive system functionality to external systems. Such control may be performed using a set of API functions that limit the interaction between a given state machine and components of the larger system.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. A system 100 may a plurality of separate components in communication with a state machine evaluation platform 104. The state machine evaluation platform 104 may include, for example, components for providing a message queue that can receive event messages from various components of the system, such as a messaging server 102 (e.g., an email server or SMS server), an e-commerce platform 112 (e.g., a web server implementing an e-commerce page), or a customer relationship management system 110 (e.g., a customer database). The system 100 may also include an authoring interface 108 and a monitoring interface 106 for authoring and monitoring state machines executing via the state machine evaluation platform 104, respectively.

The authoring interface 108 may provide a mechanism for creating and instantiating new state machines for use with the state machine evaluation platform 104. The authoring interface 108 may provide an IDE that allows a user to define the events that the state machine will listen for, author a set of script to define the processing of the state machine, and cause execution of the state machine via the state machine evaluation platform 104.

Upon definition, the state machine evaluation platform 104 may initialize one or more instances of each state machine. For example, in some embodiments a separate state machine may be created for each user of the system, each customer in a customer relationship database (e.g., the customer relationship management system 110), or for various other instances. Upon initialization of the state machine(s), each state machine may begin accessing a message queue maintained by the state machine evaluation platform 104. The state machine may process each message received from the message queue according to processing defined in the scripted language associated with the state machine.

The authoring interface 108 may also be configured to translate the script associated with the state machine into a set of executable code executed by the state machine evaluation platform 104. Translation of the script into executable code may be performed by an interpretation process, such as through the use of an interpreted language such as Python®. Embodiments may provide for version control and source code management of scripts for state machines. For example, some embodiments may maintain a version number for each script which is incremented as scripts are updated or modified. Other embodiments may compute a checksum or hash value (e.g., an MD5 hash) for each set of script associated with a state machine.

The authoring interface 108 may also provide a mechanism for simulating a message queue and/or events to be added to the message queue for the purpose of testing and/or evaluation state machines. The authoring interface 108 may provide a mechanism for tracking a status of a particular state machine and determining the state of the state machine as events occur.

The monitoring interface 106 may provide a dashboard or other graphical user interface (GUI) for viewing the status of state machines executing via the state machine evaluation platform. For example, the monitoring interface 106 may track the number of times a particular state machine has entered each state, the number of executing state machines of a particular state machine type, or the like. This monitoring may occur via instrumentation built into executing state machines which is provided as part of the interpretation process.

The state machine evaluation platform 104 may thus include a message queue, a set of executing state machines, and interfaces with an authoring system and various other system components. The interface with the authoring system may provide the ability for definition of new state machines, and the interfaces with other system components may allow executing state machines to interact with other components of the system, such as to send emails via the messaging server 102, to adjust product prices, inventory levels, or the like via the e-commerce platform 112, or make changes to a customer relationship management system 110. These interactions may occur through the use of an API exposed to the state machines, ensuring that the state machines only perform authorized actions. As noted above, in some embodiments the authoring interface 108 may be exposed to external systems, such as a merchant system, for authoring of state machines by external parties. The use of APIs in this manner may prevent the performance of unauthorized activities. In some embodiments, different APIs may be exposed to external systems, or external systems may only be allowed to perform status monitoring, tracking, and analytics-related tasks. In yet further embodiments, state machines provided by external systems may be placed within a sandbox, allocated their own memory, or otherwise segregated from other system components.

Example Apparatus for Implementing Embodiments of the Present Invention

The system 100 may be embodied by one or more computing systems, such as the apparatus 200 shown in FIG. 2. As illustrated in FIG. 2, the apparatus 200 may include a processor 202, a memory 204, input/output circuitry 206, communications circuitry 208, state machine management circuitry 210, authoring circuitry 212, and system functional circuitry 214. The apparatus 200 may be configured to execute the operations described above with respect to FIG. 1. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The state machine management circuitry 210 includes hardware configured to execute and manage one or more state machines, a message queue, and interfaces with other components of the system for executing functionality defined within the state machines. In this regard, the state machine management circuitry 210 may include one or more memories, processors, and the like for performing these tasks, such as the processor 202 and memory 204. It should also be appreciated that, in some embodiments, the state machine management circuitry 210 may include a separate processor, specially configured field programmable gate array (FPGA), or application specific interface circuit (ASIC) in addition to the processor 202 to manage state machines. The state machine management circuitry 210 is therefore implemented using hardware components of the apparatus configured by either hardware or software for implementing these planned functions.

The authoring circuitry 212 includes hardware configured to provide an IDE for defining one or more state machines. As noted above, definition of a state machine may include defining one or more events that function as inputs to the state machine, a set of scripted interactions based on those events that define actions to be taken by the state machine, and the like. The authoring circuitry 212 may also provide hardware configured for interpreting script to create an executable state machine which is executed by the state machine management circuitry. The authoring circuitry 212 may also include debugging and simulation tools for simulating inputs (e.g., message queue events) to the state machine. To perform these functions, the authoring circuitry 212 may include a processor or processing circuitry, such as the processor 202, to implement the interface for authoring state machines. Although the processor 202 may be employed to perform these tasks, it should also be appreciated that, in some embodiments, the authoring circuitry 212 may include a separate processor, specially configured field programmable gate array (FPGA), or application specific interface circuit (ASIC) to perform such tasks. The authoring circuitry 212 is therefore implemented using hardware components of the apparatus configured by either hardware or software for implementing these planned functions.

The system functional circuitry 214 includes hardware configured to provide various system functionalities, such as the messaging server, customer relationship management system, and the like as described above. The system functional circuitry 214 may communicate with the state machine management circuitry 210 to implement various functions defined by state machines executing within the state machine management circuitry. The system functional circuitry 214 may perform these functions using processing circuitry, such as the processor 202. Although the processor 202 may be employed to perform warranty management functions, it should also be appreciated that, in some embodiments, the system functional circuitry 214 may include a separate processor, specially configured field programmable gate array (FPGA), or application specific interface circuit (ASIC) to perform such tasks. The system functional circuitry 214 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Additional Discussion of Methods, Systems, and Apparatuses for Providing a Real-Time Event Evaluation Framework Examples of use cases illustrating a need for a real-time event evaluation framework include a subscription follow-up, a view follow-up, and an abandoned cart.

In the case of a subscription follow-up, a new customer may have recently subscribed to a promotion and marketing service, and a marketing department would like to transmit an email to the new customer about enticing promotions after a pre-determined period of time (e.g., 12 hours). An action, such as the email transmission, can be associated with a timer that is set for the pre-determined period of time (e.g., 12 hours). As such, the email will be transmitted to the new customer when the timer expires.

In the case of a view follow-up, a particular customer may have viewed or somehow interacted with a device rendered object (e.g., deal) but has not initiated a purchase transaction for the device rendered object. An action, such as providing the particular customer a dollar incentive, can be associated with a timer such that after the timer expires the action will occur. As such, the particular customer may be presented with the dollar incentive after the timer expires (e.g., 5 hours later). The action may include re-evaluating the purchase transaction status before presenting the customer with the incentive.

In the case of an abandon cart situation, a particular customer may have added one or more deals to a shopping cart interface. After a pre-determined period of time, a reminder communication may be transmitted to the customer about the one or more deals saved in the shopping cart interface if the customer has not completed a purchase transaction for the one or more deals. The action of transmitting the reminder communication may include the step of re-evaluating the purchase transaction condition after the timer expires (e.g., 4 hours later).

The following is an exemplary evaluation template pattern common to the use cases discussed.

while unless all_events.empty?
  ev=all_events.pop
  workflows=find_workflows_interested_in(ev)
  workflow.for {|wf|
    wf.for(ev.user_uuid).state_transition_given(ev).
      take_action_if_any( )
  }
end #while.

FIG. 3 illustrates an example real time event evaluation platform topology in accordance with some example embodiments of the present invention. In some embodiments, a workflow of the real time event evaluation platform 300 is a non-deterministic finite automaton (NFA). In this approach, the workflow state transition component keeps the state of the NFA and the action history is not stored anywhere.

The real time event evaluation platform topology 300 comprises various components. A business user computing device 301 may define non-deterministic finite automata (NFA) 302. From the definition of the non-deterministic finite automata (NFA), a script is generated 303, which is then submitted 304 to real time event evaluation platform 305. The real time event evaluation platform 305 receives company registered user events 307 as input during script evaluation 308. The real time event platform 305 may, in some embodiments, consider action lists of a past period of network time (e.g., 24 hours) while evaluating multiple NFA's simultaneously.

FIG. 4 illustrates an example data flow 400 within a real time event evaluation platform in accordance with some embodiments of the present invention.

In some embodiments, a data flow 400 receives a message or set of messages within event messages 401. An event action filter component 402, given the event messages, determines the workflows which take the given message as part of the workflows' interested inputs. For example, an abandon cart workflow or NFA might only be interested in the abandoned cart event. Anything other than the abandoned cart event will not cause any state change in the workflow of the user who triggered the abandoned cart event. The event action filter component 402 determines the workflows of which inputs are associated with the event, and calls the workflow state transition component 403 with the event to initiate a state transition.

Given an action input defined as a specific workflow, the event type, the user/actor identifier, and the event payload, the workflow state transition component 403 causes the necessary state transition to occur. The workflow state transition component 403 is responsible for maintaining the state of each user for each workflow; evaluating the current state of the user for any specific workflow; state transitioning the user to a different state given the action input; and taking any follow-up actions necessary as part of landing into a different state.

The deferred action component 404 generates waiting or timeout actions that are taken after a certain network time period. For example, an abandon cart event may need a re-evaluation after 4 hours after the initial event to determine whether the user is truly eligible for an abandon cart associated message or action. The 4 hour waiting action is taken with the help of the deferred action component 404.

The deferred action component 404 can achieve the above described actions through various responsibilities, including a specified deferred action after a specified time duration and/or cancelling a deferred action given the action identifier.

In some embodiments, events are received as streams or individual events oppose to batches. Given such conditions, the framework may support stream or micro-batch data processing such as Apache Spark or Storm.

Advantage of the above data flow options include dependent service integration contained in one place; easy to simulate state transition for both testing and operations with a simple service call; easy to add more processes or hosts if needed to increase throughput.

FIG. 5 illustrates an example data flow 500 within a real time event evaluation platform in accordance with some embodiments of the present invention. In this approach, the state of each workflow is not maintained. Instead the state is derived every time a new event occurs along with the available events that happened in a past network time interval. Action list store 501 provides action lists to an NFA evaluator 502 comprising a plurality of NFAs 503. New events 504 trigger evaluations by the NFA evaluator 502. In some embodiments, a stream batch workflow results in the NFA evaluator 502 considering action lists of a trailing network time interval (e.g., 24 hours) so that multiple NFAs are evaluated simultaneously.

FIG. 6 illustrates an exemplary script generation interface 600 for use with embodiments of the present invention. The business user is able to define state transitions and test the execution with a series of catered events with the event simulator to generate the desired behavior. The platform provides a set of APIs that the user can use inside his/her workflow.

FIG. 7 illustrates a status tracker interface 700 for use with embodiments of the present invention. When an NFA script goes live, a business user computing device may display metrics associated with performance related to the NFA.

FIG. 8 illustrates a backtest interface 800 for use with embodiments of the present invention. Based on historical events, a business user computing device may display a volume that could satisfy their scripted NFA.

Table 1 illustrates an example volume. A sample count includes a message type/category, and a count per day of event messages.

TABLE 1

| MESSAGE TYPE/CATEGORY | COUNT PER DAY |
| --- | --- |
| Kafka Order.Created Message | 110 k |
| Page Views Proxy Count from Incentive - Best For Calls | 3 m |
| Email Action Count | 9 m |

According to the example presented in Table 1, an expected number of event messages per day might be 12 million. Consider a case where there are N workflows to consider and assume that each workflow is interested in all events or event messages. Such an example results in potentially (12×N) million workflow state transitions a day. In some embodiments, not every workflow will be interested in every event.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for providing real time management of events in a multi-tenant system, the method comprising:
receiving a plurality of state machine definitions for a plurality of state machines;
generating a plurality of scripts, comprising generating a first script to define first data processing by a first state machine of the plurality of state machines based on a first state machine definition of the plurality of state machine definitions, and generating a second script to define second data processing by a second state machine of the plurality of state machines based on a second state machine definition of the plurality of state machine definitions;
providing messages from a message queue as input to the first state machine and the second state machine;
using the first state machine associated with the first script, monitoring the message queue to identify a first event with respect to first messages of the messages from the message queue;
using the second state machine associated with the second script, monitoring the message queue to identify a second event with respect to second messages of the messages from the message queue, wherein at least one of the first event and the second event is associated with a registered user computing device of a plurality of registered user computing devices, wherein at least one of the first event and the second event is associated with an interaction between the registered user computing device and a device rendered object, wherein the first event comprises a first event type, and the second event comprises a second event type;
in response to identifying the first event based on the monitoring using the first state machine,
generating a first electronic communication based on first executable code defined within a first application programming interface (API) accessible to the first state machine; and
transmitting the first electronic communication to the registered user computing device; and
in response to identifying the second event based on the monitoring using the second state machine,
generating a second electronic communication and updating user profile data for a user identifier associated with the registered user computer device based on second executable code defined within a second API accessible to the second state machine; and
transmitting the second electronic communication to the registered user computing device, wherein first content of the first electronic communication is different than second content of the second electronic communication, and wherein at least one of the first electronic communication and the second electronic communication is renderable via a display of the registered user computing device.

2. The method of claim 1, wherein the first event type is one or more of a first abandoned cart event, a first device rendered object view event, or a first service subscription event, and wherein the second event type is one or more of a second abandoned cart event, a second device rendered object view event, or a second service subscription event.

3. The method of claim 1, wherein the first electronic communication is one or more of a first email message or a first SMS message, and wherein the second electronic communication is one or more of a second email message or a second SMS message.

4. The method of claim 1, wherein a state machine of the plurality of state machines comprises a plurality of states and a plurality of defined messages.

5. The method of claim 4, wherein each message of the plurality of defined messages results in a state transition.

6. The method of claim 5, wherein each state of the plurality of states is associated with a particular action to be performed.

7. A system for real time management of events in a multi-tenant system, the system comprising one or more processors and one or more storage devices storing instructions that are operable, when executed by the one or more processors, to cause the system to:
receive a plurality of state machine definitions for a plurality of state machines;
generate a plurality of scripts, wherein the plurality of scripts comprise a first script to define first data processing by a first state machine of the plurality of state machines based on a first state machine definition of the plurality of state machine definitions, and wherein the plurality of scripts comprise a second script to define second data processing by a second state machine of the plurality of state machines based on a second state machine definition of the plurality of state machine definitions;

provide messages from a message queue as input to the first state machine and the second state machine;

using the first state machine associated with the first script, monitor the message queue to identify a first event with respect to first messages of the messages from the message queue;

using the second state machine associated with the second script, monitor the message queue to identify a second event with respect to second messages of the messages from the message queue, wherein at least one of the first event and the second event is associated with a registered user computing device of a plurality of registered user computing devices, wherein at least one of the first event and the second event is associated with an interaction between the registered user computing device and a device rendered object, wherein the first event comprises a first event type, and the second event comprises a second event type;

in response to identifying the first event based on the monitoring using the first state machine,
  generate a first electronic communication based on first executable code defined within a first application programming interface (API) accessible to the first state machine; and
  transmitting the first electronic communication to the registered user computing device; and in response to identifying the second event based on the monitoring using the second state machine,
  generate a second electronic communication and update user profile data for a user identifier associated with the registered user computer device based on second executable code defined within a second API accessible to the second state machine; and
  transmit the second electronic communication to the registered user computing device, wherein first content of the first electronic communication is different than second content of the second electronic communication, and wherein at least one of the first electronic communication and the second electronic communication is renderable via a display of the registered user computing device.

8. The system of claim 7, wherein the first event type is one or more of a first abandoned cart event, a first device rendered object view event, or a first service subscription event, and wherein the second event type is one or more of a second abandoned cart event, a second device rendered object view event, or a second service subscription event.

9. The system of claim 7, wherein the first electronic communication is one or more of a first email message or a first SMS message, and wherein the second electronic communication is one or more of a second email message or a second SMS message.

10. The system of claim 7, wherein a state machine of the plurality of state machines comprises a plurality of states and a plurality of defined messages.

11. The system of claim 10, wherein each message of the plurality of defined messages results in a state transition.

12. The system of claim 11, wherein each state of the plurality of states is associated with a particular action to be performed.

13. A computer program product, stored on a computer readable medium, comprising instructions that when executed by one or more computers cause the one or more computers to:
  receive a plurality of state machine definitions for a plurality of state machines;
  generate a plurality of scripts, wherein the plurality of scripts comprise a first script to define first data processing by a first state machine of the plurality of state machines based on a first state machine definition of the plurality of state machine definitions, and wherein the plurality of scripts comprise a second script to define second data processing by a second state machine of the plurality of state machines based on a second state machine definition of the plurality of state machine definitions;
  provide messages from a message queue as input to the first state machine and the second state machine;
  using the first state machine associated with the first script, monitor the message queue to identify a first event with respect to first messages of the messages from the message queue;
  using the second state machine associated with the second script, monitoring the message queue to identify a second event with respect to second messages of the messages from the message queue, wherein at least one of the first event and the second event is associated with a registered user computing device of a plurality of registered user computing devices, wherein at least one of the first event and the second event is associated with an interaction between the registered user computing device and a device rendered object, wherein the first event comprises a first event type, and the second event comprises a second event type;
  in response to identifying the first event based on the monitoring using the first state machine,
    generate a first electronic communication based on first executable code defined within a first application programming interface (API) accessible to the first state machine; and
    transmit the first electronic communication to the registered user computing device; and
  in response to identifying the second event based on the monitoring using the second state machine,
    generate a second electronic communication and update user profile data for a user identifier associated with the registered user computer device based on second executable code defined within a second API accessible to the second state machine; and
    transmit the second electronic communication to the registered user computing device, wherein first content of the first electronic communication is different than second content of the second electronic communication, and wherein at least one of the first electronic communication and the second electronic communication is renderable via a display of the registered user computing device.

14. The computer program product of claim 13, wherein the first event type is one or more of a first abandoned cart event, a first device rendered object view event, or a first service subscription event, and wherein the second event type is one or more of a second abandoned cart event, a second device rendered object view event, or a second service subscription event.

15. The computer program product of claim 13, wherein the first electronic communication is one or more of a first email message or a first SMS message, and wherein the second electronic communication is one or more of a second email message or a second SMS message.

16. The computer program product of claim 13, wherein a state machine of the plurality of state machines comprises a plurality of states and a plurality of defined messages.

17. The computer program product of claim 16, wherein each message of the plurality of defined messages results in a state transition.

18. The computer program product of claim 17, wherein each state of the plurality of states is associated with a particular action to be performed.

\* \* \* \* \*